(12) United States Patent
Rice et al.

(10) Patent No.: US 11,603,304 B2
(45) Date of Patent: Mar. 14, 2023

(54) POD ASSEMBLY FOR BEVERAGE MACHINE

(71) Applicant: BEDFORD SYSTEMS LLC, Bedford, MA (US)

(72) Inventors: Ian Scott Rice, Framingham, MA (US);
Catherine Fox, Arlington, MA (US);
Daniel J. Place, Medford, MA (US);
Enrico Raffaele Cafaro, Beverly, MA (US)

(73) Assignee: Bedford Systems LLC, Bedford, MA (US)

( * ) Notice: Subject to any disclaimer, the term of this patent is extended or adjusted under 35 U.S.C. 154(b) by 894 days.

(21) Appl. No.: 16/362,439

(22) Filed: Mar. 22, 2019

(65) Prior Publication Data

US 2019/0292036 A1 Sep. 26, 2019

Related U.S. Application Data

(60) Provisional application No. 62/646,800, filed on Mar. 22, 2018.

(51) Int. Cl.
*B67D 1/08* (2006.01)
*B67D 1/00* (2006.01)
(Continued)

(52) U.S. Cl.
CPC .......... *B67D 1/0807* (2013.01); *A47J 31/407* (2013.01); *B67D 1/0078* (2013.01);
(Continued)

(58) Field of Classification Search
CPC .......... B67D 1/0406; B67D 2001/0814; B67D 2001/0822; B67D 1/0078; A47J 31/407
See application file for complete search history.

(56) References Cited

U.S. PATENT DOCUMENTS 5,039,012 A 8/1991 Inaba
5,188,628 A 2/1993 Rani et al.
(Continued)

FOREIGN PATENT DOCUMENTS

CN 1408622 A 4/2003
CN 101166671 A 4/2008
(Continued)

OTHER PUBLICATIONS

International Search Report and Written Opinion of the International Searching Authority for International Patent Application No. PCT/US2017/064343, dated Feb. 19, 2018 (11 pages).
(Continued)

*Primary Examiner* — Dana Ross
*Assistant Examiner* — Kuangyue Chen
(74) *Attorney, Agent, or Firm* — Dorsey & Whitney LLP (57) ABSTRACT

A beverage pod for a beverage machine is provided. The beverage pod can include a container having an internal space and a container flange defining an opening to the internal space, a plug sealing the opening of the container, and a cap secured to the container flange. A beverage medium can be located within the internal space of the container. The cap can be operable to selectively engage a portion of the plug to release the beverage medium through the plug and the cap.

17 Claims, 7 Drawing Sheets

(51) Int. Cl.
    *A47J 31/40* (2006.01)
    *B67D 1/04* (2006.01)

(52) U.S. Cl.
    CPC .... *B67D 1/0406* (2013.01); *B67D 2001/0814* (2013.01); *B67D 2001/0822* (2013.01)

(56) References Cited

U.S. PATENT DOCUMENTS

| | | | |
|---|---|---|---|
| 5,817,082 | A | 10/1998 | Niedospial et al. |
| 5,902,298 | A | 5/1999 | Niedospial et al. |
| 6,142,063 | A | 11/2000 | Beaulieu et al. |
| 6,606,938 | B2 | 8/2003 | Taylor |
| 6,644,173 | B2 | 11/2003 | Lazaris et al. |
| 7,165,488 | B2 | 1/2007 | Bragg et al. |
| 7,316,178 | B2 | 1/2008 | Halliday et al. |
| 9,801,494 | B2 | 10/2017 | Castellani |
| 2009/0308882 | A1 | 12/2009 | Hundley |
| 2014/0048549 | A1 | 2/2014 | Wille |
| 2015/0059588 | A1* | 3/2015 | Castellani ............ A47J 31/0673 99/295 |
| 2015/0203285 | A1* | 7/2015 | Baldo ................ B65D 85/8043 426/112 |
| 2015/0368033 | A1* | 12/2015 | Krug ................. B65D 85/8064 426/112 |
| 2016/0106256 | A1* | 4/2016 | Gordon ................... A47J 31/46 99/295 |
| 2016/0107831 | A1* | 4/2016 | Talon .................... A47J 31/407 426/115 |
| 2016/0137402 | A1* | 5/2016 | Talon ................. B65D 85/8055 99/295 |
| 2016/0297664 | A1 | 10/2016 | Broodryk |
| 2019/0016580 | A1 | 1/2019 | Krüger et al. |
| 2019/0077586 | A1 | 3/2019 | Cafaro et al. |
| 2019/0256279 | A1 | 8/2019 | Mühlemann |
| 2021/0000283 | A1* | 1/2021 | Burrows ............. A47J 31/4492 |

FOREIGN PATENT DOCUMENTS

| | | | |
|---|---|---|---|
| CN | 101817419 | A | 9/2010 |
| CN | 101888954 | A | 11/2010 |
| CN | 102395304 | A | 3/2012 |
| CN | 102596753 | A | 7/2012 |
| CN | 203461294 | U | 3/2014 |
| CN | 104093339 | A | 10/2014 |
| CN | 104203054 | A | 12/2014 |
| CN | 104321265 | A | 1/2015 |
| CN | 105358454 | A | 2/2016 |
| CN | 106494743 | A | 3/2017 |
| CN | 106983369 | A | 7/2017 |
| CN | 107531402 | A | 1/2018 |
| GB | 1106633 | A | 3/1968 |
| WO | 2010076698 | A1 | 7/2010 |
| WO | 2011094677 | A2 | 8/2011 |
| WO | 2012146470 | A1 | 11/2012 |
| WO | 2014037598 | A1 | 3/2014 |
| WO | 2016040268 | A2 | 3/2016 |
| WO | 2017121798 | A1 | 7/2017 |
| WO | WO-2017121798 | A1 * | 7/2017 .......... B65D 51/226 |
| WO | 2017137933 | A1 | 8/2017 |
| WO | 2018007383 | A1 | 1/2018 |

OTHER PUBLICATIONS

International Search Report and Written Opinion for International Application No. PCT/US2019/023560 dated Jul. 4, 2019.
Extended European Search Report for EP Application No. 19772423.0 dated Nov. 22, 2021.

* cited by examiner

POD ASSEMBLY FOR BEVERAGE MACHINE

CROSS-REFERENCE TO RELATED APPLICATION

This patent application is a nonprovisional patent application of and claims priority to U.S. Provisional Patent Application No. 62/646,800, filed Mar. 22, 2018, and titled "Pod Assembly for Beverage Machine," the disclosure of which is hereby incorporated by reference in its entirety.

TECHNICAL FIELD

The technology disclosed herein relates generally to beverage dispensers, and more particularly to beverage cartridges used in a beverage machine.

BACKGROUND

Liquid dispensers are appliances that prepare drinks for users. Often, a dispenser will include a connection to a water source, such as a reservoir or the plumbing of a building, and a receiver that receives a cartridge or capsule containing a flavoring agent. The appliance opens the cartridge or capsule and combines the flavoring agent with water to generate a desired beverage.

A number of different configurations are used by the prior art to pierce the cartridges or capsules and dispense the flavoring agent into a user's cup. Some appliances pressurize the cartridge or capsule to create a forceful dispensing operation and/or facilitate emptying of the cartridge or capsule. Some appliances include mechanisms to create multiple openings within the cartridge or capsule. Some appliances include multiple passageways facilitating the dispensing operation, such as a first passageway to pressurize the cartridge or capsule, and a second passageway to dispense the contents of the cartridge or capsule into a user's cup.

In addition, many configurations exist for sealing the flavoring agent within the cartridge or capsule. For example, some appliances utilize a sealing arrangement as part of the cartridge's cap or container.

SUMMARY

Aspects of the present disclosure relate to a pod assembly that can be used to make a beverage, such as a carbonated and/or flavored beverage, a still flavored beverage, a cocktail, a hot flavored beverage, and others. While not required, the pod assembly can be usable with a beverage machine configured to use the pod assembly and its contents to form a beverage. In some embodiments, a container can hold a beverage material that can be used to make a beverage, for example by mixing the beverage material with water or other liquid. A beverage material included in a container can include any suitable beverage making materials (beverage material), such as concentrated syrups, alcohol, ground coffee or liquid coffee extract, tea leaves, dry herbal tea, powdered beverage concentrate, dried fruit extract or powder, natural and/or artificial flavors or colors, acids, aromas, viscosity modifiers, clouding agents, antioxidants, powdered or liquid concentrated bouillon or other soup, powdered or liquid medicinal materials (such as powdered vitamins, minerals, bioactive ingredients, drugs or other pharmaceuticals, nutraceuticals, etc.), powdered or liquid milk or other creamers, sweeteners, thickeners, and so on. As used herein, "mixing" of a liquid with a beverage material includes a variety of mechanisms, such as the dissolving of substances of the beverage material in the liquid, the extraction of substances from the beverage material, and/or the liquid otherwise receiving some material from the beverage material or otherwise combining with the beverage material.

In an embodiment, a beverage pod for a beverage machine is disclosed. The beverage pod can include a container having an internal space and an opening extending into the internal space. The beverage pod can further include a beverage medium located within the internal space. The beverage pod can further include a plug configured to seal the container at the opening. The beverage pod can further include a cap secured to the container around the opening and operable to selectively engage a portion of the plug to release the beverage medium.

In another embodiment, the cap can include a piercing assembly movable relative to the plug. The piercing assembly can include a piercing element defining a lumen. In some cases, movement of the piercing assembly towards and partially into the plug causes the piercing element to pierce the plug for release of the beverage medium from the internal space through the lumen. In some cases, a centerline of the lumen can be offset from a centerline of the piercing element.

In another embodiment, the piercing element can further include a side port configured that defines a flow path into the internal space in response to the movement of the piercing element towards the plug. In this regard, the cap can further include a gas inlet port fluidically coupled with the side port and arranged to deliver pressurized gas into the internal space of the container. The beverage pod can further include a drip ledge extending from a bottom surface of the piercing assembly and be configured to direct beverage medium from the lumen and toward the beverage machine. In some cases, the cap includes an annular bottom flange. The piercing assembly can include a cylindrical piston with a bottom wall. The piston can be movable towards the plug. The piercing assembly can further include a resilient annular web connecting the piston to the bottom flange of the cap.

In another embodiment, the beverage pod further includes a gasket positioned at least partially between the container and the plug. The plug can include an annular plug flange. As such, the gasket can be positioned between the plug flange of the plug and a container flange of the container. In some cases, the gasket can engage the container, the plug, and the cap.

In another embodiment, a cap for a beverage pod is disclosed. The cap includes an outer portion engageable with a container. The cap further includes a piercing assembly movable relative to the outer portion. The piercing assembly includes a cylindrical piston. The piercing assembly further includes a resilient annular web connecting the cylindrical piston to the outer portion. The piercing assembly further includes a piercing element extending from the cylindrical piston and defining a lumen. The cap further includes a gas inlet port in fluid communication with the piercing element.

In another embodiment, the outer portion can substantially surround the piercing assembly. Additionally, a centerline of the lumen can be offset from a centerline of the piercing element. The piercing element can include a side port in fluid communication with the gas inlet port. In some cases, the cap further includes a drip ledge extending from a bottom wall of the piston. The drip ledge can define an aperture in fluid communication with the lumen and being configured to direct beverage medium from the lumen and toward a beverage machine.

In another embodiment, a beverage pod for a beverage machine is disclosed. The beverage pod includes a container having an internal space and an opening to the internal space. The beverage pod further includes a beverage medium located within the internal space of the container. The beverage pod further includes a plug positioned to cover the opening of the container. The beverage pod further includes a cap secured to the container. The beverage pod further includes a gasket arranged to create a first seal between the plug and the container, and a second seal between the container and the cap.

In another embodiment, the gasket can engage each of the container, the plug, and the cap. The gasket can be positioned between the plug and the container. The cap can engage at least a portion of the plug. The cap can be integrated with the pod to compress the gasket between the plug and the container. The gasket can be configured to maintain the internal space at a pressure above an ambient pressure surrounding the beverage pod.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present disclosure as defined in the claims is provided in the following written description of various embodiments of the claimed subject matter and illustrated in the accompanying drawings.

BRIEF DESCRIPTION OF THE DRAWINGS

FIG. 5 is a cross sectional view of a cap of the beverage pod in accordance with various aspects of the present disclosure. FIG. 5 is taken along line 5-5 of FIG. 3.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein, and, accordingly, may not necessarily be presented or illustrated to scale, and are not intended to indicate any preference or requirement for an illustrated embodiment to the exclusion of embodiments described with reference thereto.

DETAILED DESCRIPTION

It should be understood that aspects of the present disclosure are described herein with reference to the figures, which show illustrative embodiments. The illustrative embodiments described herein are not necessarily intended to show all embodiments in accordance with the present disclosure, but rather are used to describe a few illustrative embodiments. Thus, aspects of the invention are not intended to be construed narrowly in view of the illustrative embodiments. In addition, it should be understood that aspects of the exemplary systems and methods can be used alone or in any suitable combination with other aspects of the invention.

Figure 1:
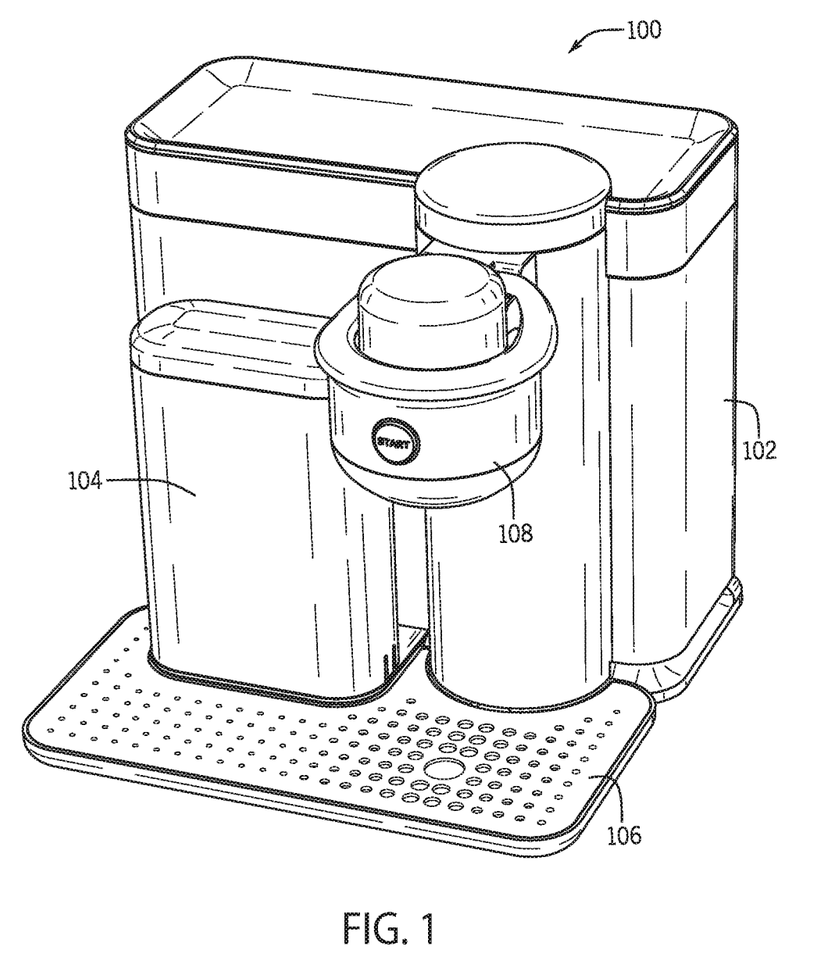
FIG. 1 is an isometric view of a beverage appliance or machine in accordance with various aspects of the present disclosure.

Turning to the figures, illustrative embodiments of the present disclosure will now be discussed in more detail. FIG. 1 is an isometric view of a beverage appliance or machine 100 in accordance with various aspects of the present disclosure. The beverage machine 100 can include a housing 102 that shields various components of the machine, a reservoir 104 that holds a liquid (e.g., water) used to form a beverage, and a drip tray 106 that supports a user's cup or other container for receiving a dispensed beverage.

The reservoir 104 can be removable from the housing 102 such that a user can fill the reservoir 104 with a beverage precursor liquid, such as water, that is used to form a beverage dispensed at a dispensing station 108 into a user's container. The reservoir 104 can include a movable lid to facilitate a user in filling the reservoir 104 with the precursor liquid. In various examples, the reservoir 104 can be replaced by a plumbed connection to a direct or main water source. The beverage precursor liquid can be any suitable liquid, including water or any other suitable liquid used to form a beverage. The reservoir 104 or main water source can form part of a beverage precursor supply which provides the beverage precursor liquid for conditioning of some kind (e.g., filtering, chilling, carbonating, mixing with a beverage medium, and subsequent dispensing as a beverage).

Various components of the beverage machine 100 can be located within the housing 102. For example, a pump can be located within the housing 102 and can move precursor liquid from the reservoir 104 to a carbonation system, where the precursor liquid can be carbonated via a gas. Depending on the particular application, the gas can be supplied by a pressurized canister or bottle, such as a carbon dioxide canister or bottle, located within the housing 102. In some examples, the precursor liquid can be chilled by a cooling system, either before, during, or after carbonation. Cooling the precursor liquid during carbonation can help the carbonation process. For instance, a cooler liquid tends to dissolve carbon dioxide or other gas more rapidly and/or is capable of dissolving a larger amount of gas. In some examples, the precursor liquid is cooled to about four degrees Celsius or lower to facilitate carbonation of the precursor liquid.

The carbonated liquid can be moved to the dispensing station 108 and dispensed into the container 108. To generate a desired beverage, the carbonated liquid can be mixed with a beverage medium 120 (e.g., a flavoring agent) contained in a beverage cartridge or pod 122 (see FIG. 4). The beverage medium 120 can be emptied from the beverage pod 122 in many ways. For instance, the beverage medium 120 can drain from the beverage pod 122 by gravity. Additionally or alternatively, as explained more fully below, the beverage medium 120 can be moved out of the beverage pod 122 by introducing gas or fluid into the beverage pod 122 under pressure, as explained more fully below.

Control of the beverage machine 100 and its components can be performed by control circuitry, which can include a programmed general purpose computer and/or other data processing devices along with suitable software or other operating instructions, one or more memories (including non-transient storage media that can store software and/or other operating instructions), a power supply for the control circuitry and/or other system components, temperature and liquid level sensors, pressure sensors, RFID interrogation devices or other machine readable indicia readers (such as those used to read and recognize alphanumeric text, barcodes, security inks, etc.), input/output interfaces (e.g., such as a user interface to display information to a user and/or receive input from a user), communication buses or other links, a display, switches, relays, triacs, motors, mechanical linkages and/or actuators, and/or other components necessary to perform desired input/output or other functions of the beverage machine 100.

Figure 2:
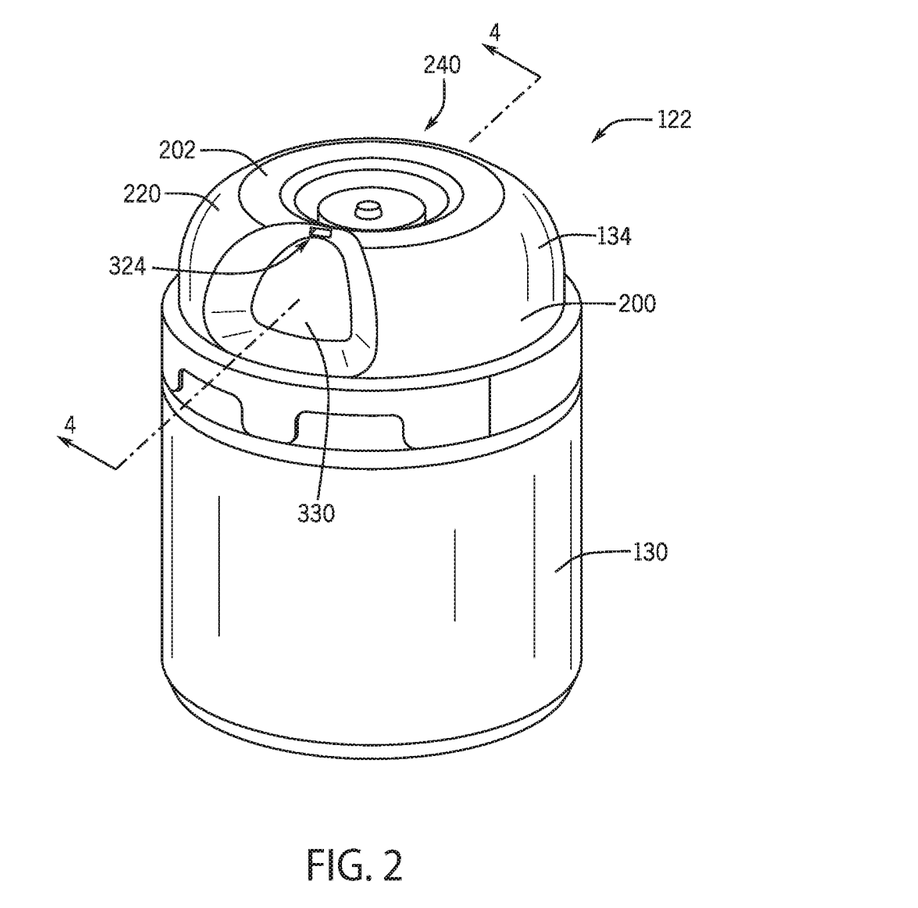
FIG. 2 is an isometric view of a beverage pod in accordance with various aspects of the present disclosure.
Figure 3:
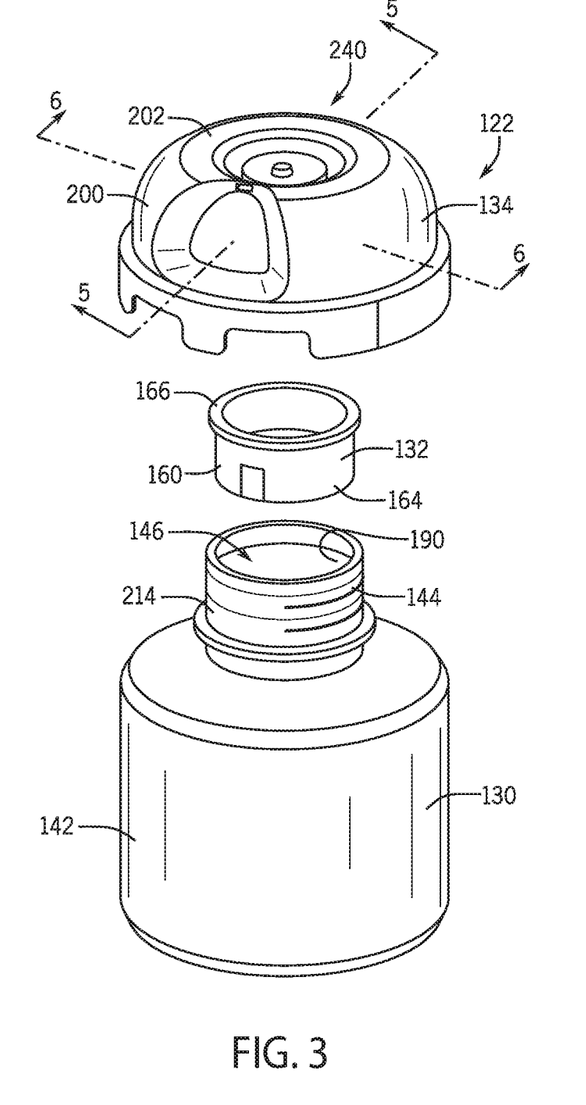
FIG. 3 is an exploded view of the beverage pod of FIG. 2.
Figure 4:
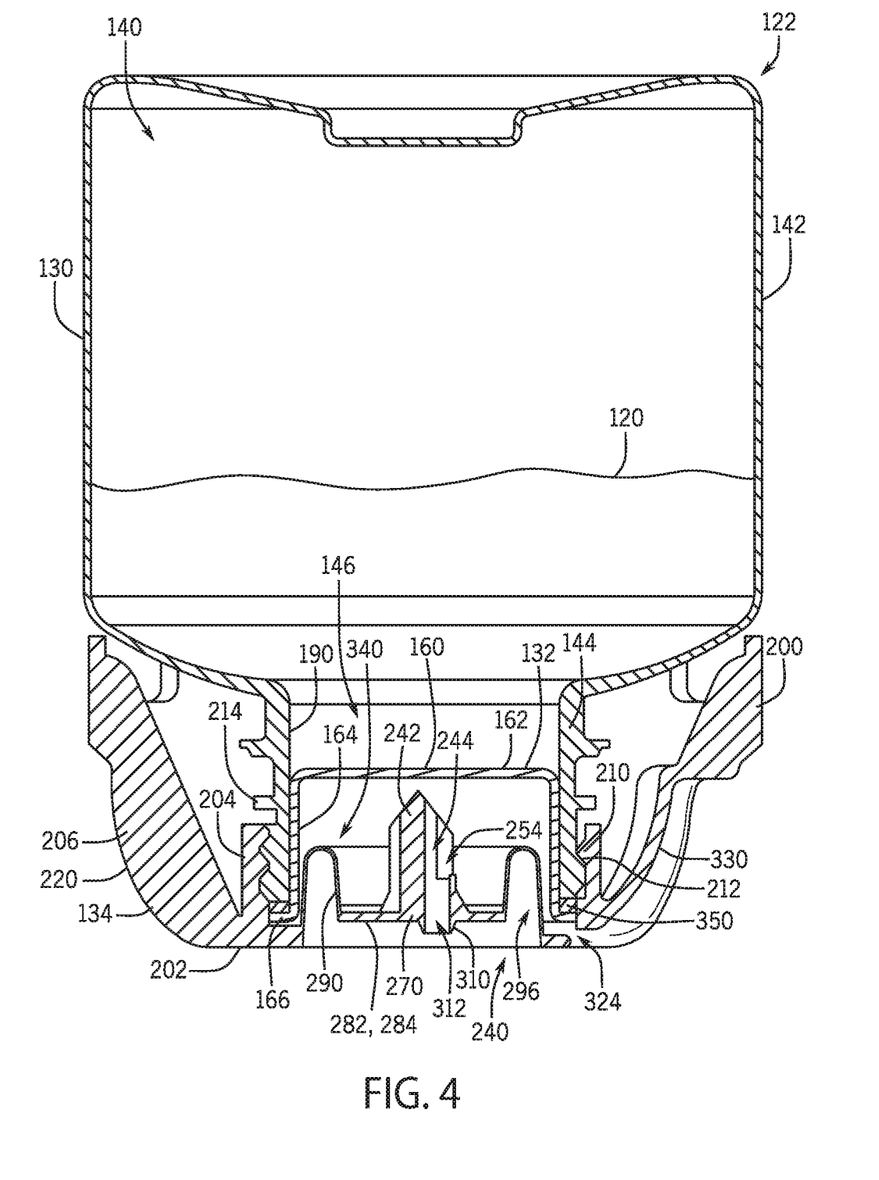
FIG. 4 is a cross sectional view of the beverage pod of FIG. 2 and taken along line 4-4 of FIG. 2.

FIG. 2 is an isometric view of the beverage pod 122 incorporating one or more features of the present disclosure. FIG. 3 is an exploded view of the beverage pod 122 of FIG. 2. FIG. 4 is a cross sectional view of the beverage pod 122 taken along line 4-4 of FIG. 2. Referring to FIGS. 2-4, the beverage pod 122 can include many configurations to dispense the beverage medium 120 contained therein. As noted above, the beverage medium 120 can be dispensed to mix with the precursor liquid to form a beverage. Alternatively, the beverage medium 120 can be dispensed for consumption without dilution or mixing with any other ingredient. As shown in FIGS. 2-4, the beverage pod 122 includes a container 130, a plug 132, and a cap 134. As described herein, the container 130 holds the beverage medium 120. The container 130 has an internal space 140 in which the beverage medium 120 is located. The container 130, which can be referred to as a bottle or vessel, can include many shapes and arrangements. For instance, the container 130 can include a main body portion 142 defining a substantial portion of the internal space 140. The container 130 can include a container flange 144 extending from the main body portion 142. The container flange 144 can define an opening 146 to the internal space 140. As explained below, the beverage medium 120 can pass through the opening 146 when dispensed from the beverage pod 122.

Depending on the particular application, the container flange 144 can include dimensions different than those of the main body portion 142. For example, the container flange 144 can include a height different than a height of the main body portion 142. For instance, the height of the container flange 144 can be less than the height of the main body portion 142, or vice-versa. Additionally or alternatively, the container flange 144 can include a diameter different than a diameter of the main body portion 142, such as the diameter of the container flange 144 being less than the diameter of the main body portion 142, or vice-versa.

Figure 8:
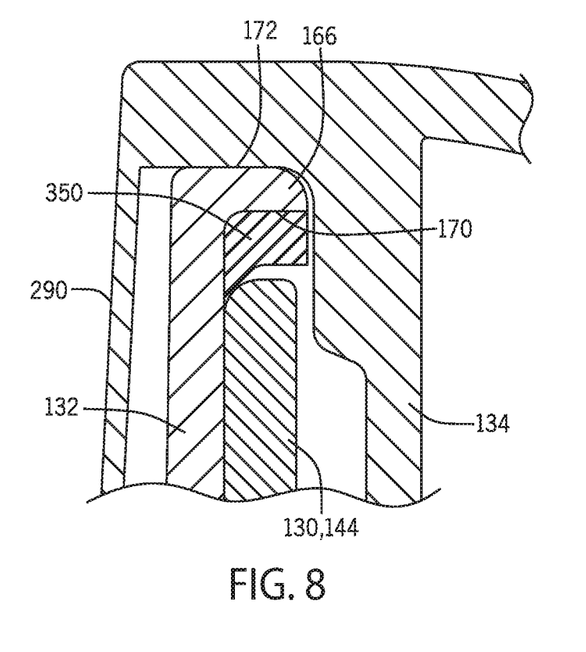
FIG. 8 is an enlarged schematic view of the connection between the various elements of the beverage pod prior to engagement of the elements.
Figure 9:
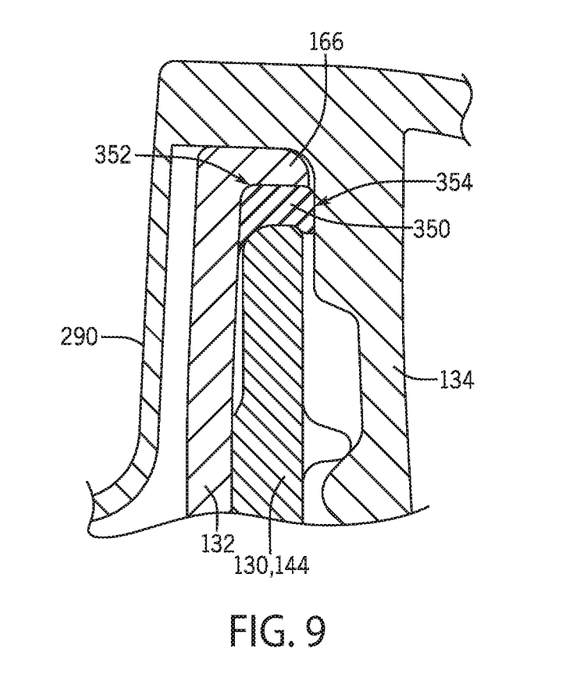
FIG. 9 is an enlarged schematic view of the connection between the various elements of the beverage pod once the elements are engaged.

Referring to FIGS. 3 and 4, the plug 132 can be positioned to cover and/or seal the opening 146 of the container 130. The plug 132 can include a cylindrical body 160 defined by a top wall 162 and a sidewall 164 extending therefrom. In some examples, the plug 132 can include an annular plug flange 166 extending radially outward from the sidewall 164 at a distance distal from the top wall 162. As shown in FIG. 4, the plug flange 166 can extend parallel or substantially parallel to the top wall 162 of the plug 132. The plug flange 166 can include opposing surfaces, such as a top surface 170 and a bottom surface 172 (as seen in FIGS. 8 and 9).

As detailed below, the top and bottom surfaces 170, 172 can be arranged to engage other elements of the beverage pod 122 to seat the plug 132 within the beverage pod 122 and/or seal the beverage medium 120 within the container 130. For instance, the top surface 170 of the plug flange 166 can seat against the container flange 144 of the container 130 to seat the plug 132 within the opening 146 of the container 130. In such examples, the cap 134 can engage the bottom surface 172 of the plug flange 166 to sandwich the plug flange 166 between the cap 134 and the container flange 144.

The cylindrical body 160 can be shaped to closely fit within the opening 146 of the container 130. In this manner, the plug 132 can be positioned at least partially within the opening 146 of the container 130. For instance, the cylindrical body 160 can be dimensioned to at least partially extend in close proximity to an inner surface 190 of the container flange 144. In one example, the cylindrical body 160 can be dimensioned to slide smoothly within the opening 146 of the container 130. In other examples, the cylindrical body 160 can be dimensioned to frictionally slide against the inner surface 190 of the container flange 144. The engagement between the plug 132 and the container 130 can create a sealing effect there between to limit or reduce leakage of the beverage medium 120 between the container flange 144 and the plug 132.

Figure 5:
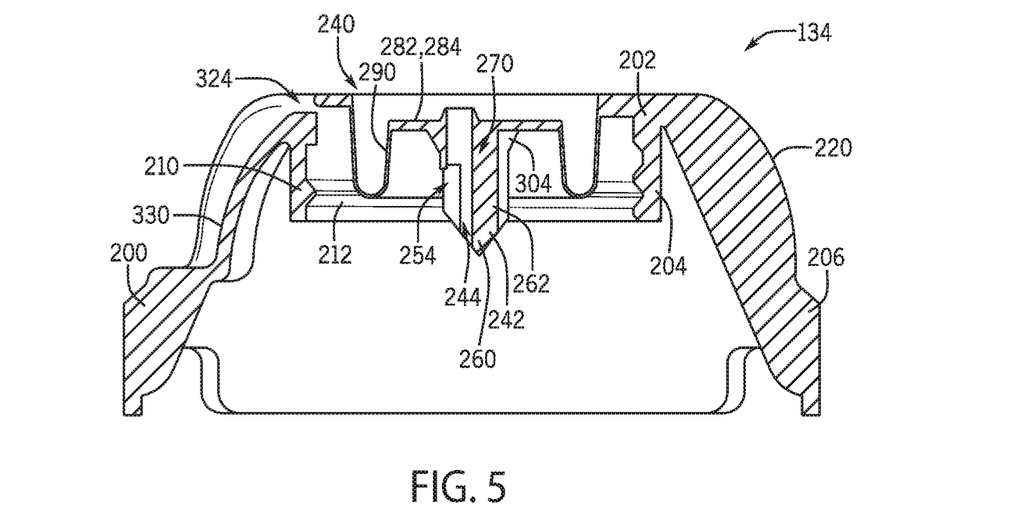
Figure 6:
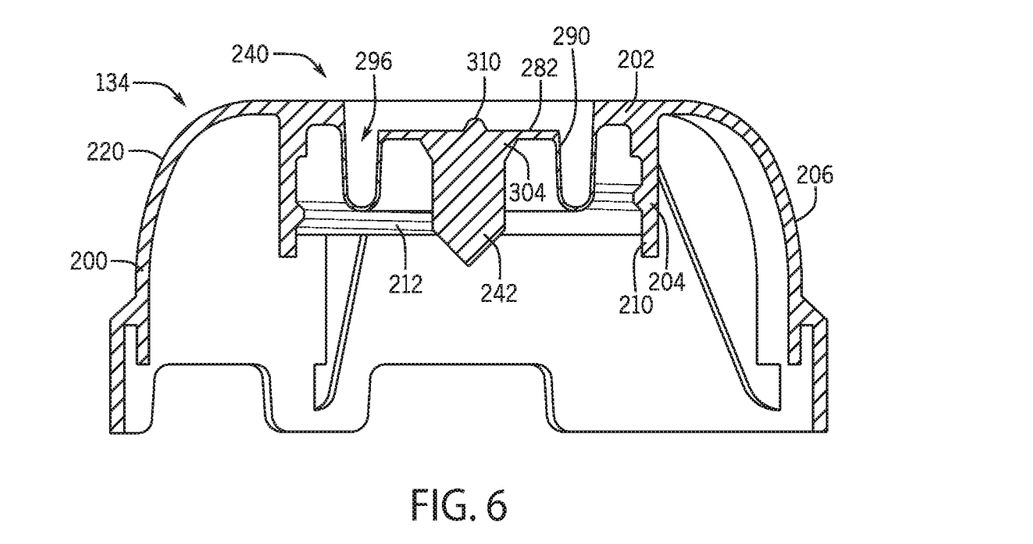
FIG. 6 is a cross sectional view of the cap and taken along line 6-6 of FIG. 3.
Figure 7:
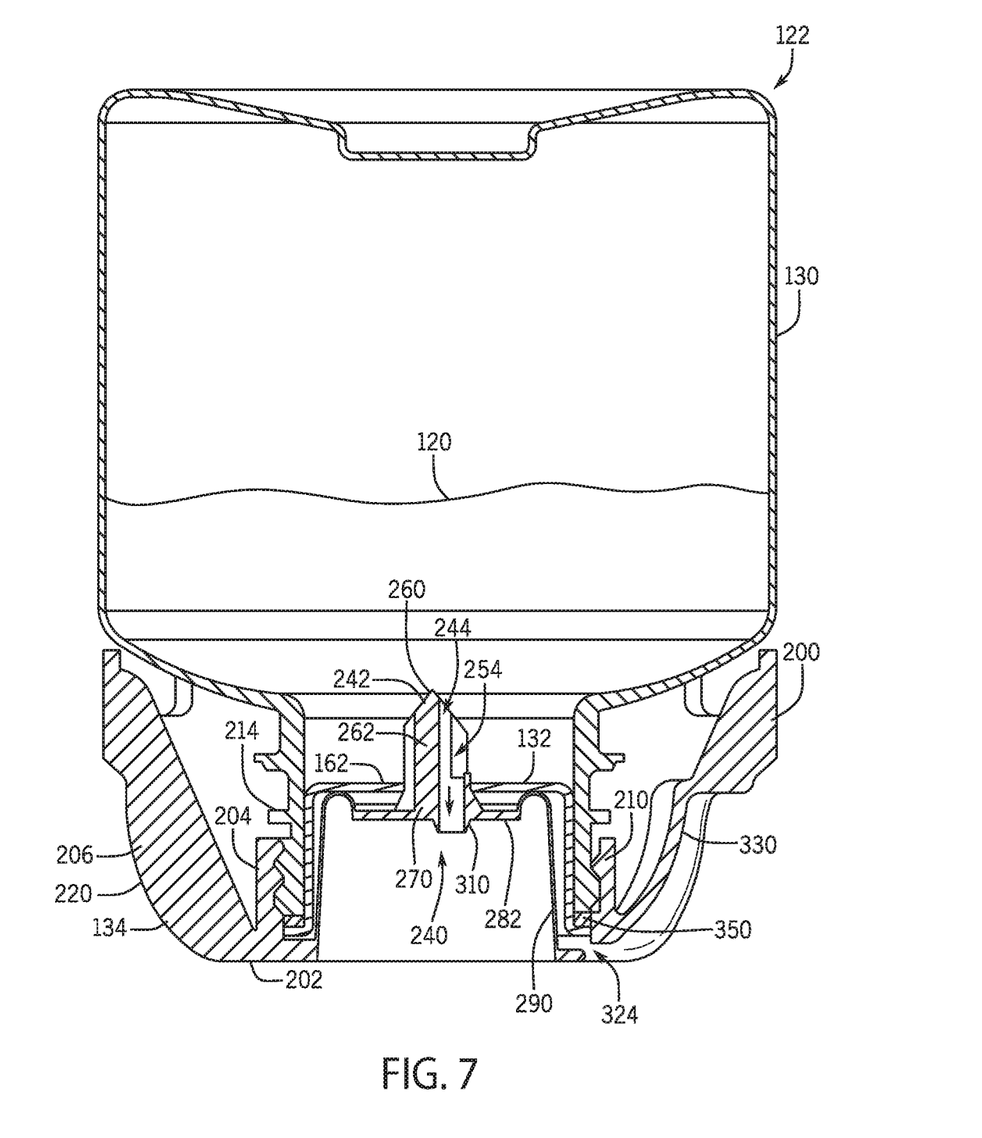
FIG. 7 is a cross sectional view of a piercing assembly of the cap piercing a sealing plug of the beverage pod in accordance with various aspects of the present disclosure.

FIG. 5 is a cross sectional view of the cap 134 of the beverage pod 122 taken along line 5-5 of FIG. 3. FIG. 6 is a cross sectional view of the cap 134 taken along line 6-6 of FIG. 3. FIG. 7 is a cross sectional view of the cap 134 piercing the plug 132 of the beverage pod 122 to release the beverage medium 120 from the container 130. Referring to FIGS. 2-7, the cap 134 can be secured to the container 130, such as to the container flange 144. In various examples, the cap 134 includes an outer portion 200 engageable with the container 130. The outer portion 200 can include an annular bottom flange 202 with first and second elements 204, 206 extending therefrom. The first element 204, which can be referred to as an engagement portion, defines a cylindrical wall 210 with features operable to engage the container flange 144 of the container 130. For example, the first element 204 can include threads 212 to threadingly engage the cap 134 to the container 130. In such examples, the container 130 can include corresponding threads 214 to mate with the threads 212 of the cap 134. The second element 206, which can be referred to as a shroud, can include an arcuate wall 220 annularly surrounding the first element 204. The second element 206 can be dimensioned to accommodate the smaller dimensions of the container flange 144. For instance, the second element 206 can extend outwardly from adjacent the first element 204 to adjacent an outermost portion of the container 130. In this manner, the second element 206 can provide a smooth transition between the bottom flange 202 of the cap 134 and the container's sidewall.

According to various aspects of the present disclosure, the cap 134 can be operable to selectively engage a portion of the plug 132 to release the beverage medium 120 from the container 130. More particularly, the cap 134 can selectively engage the plug 132 to release the beverage medium 120 through the plug 132 and the cap 134. The cap 134 can include a piercing assembly 240 movable relative to the bottom flange 202 of the outer portion 200. In this manner, the piercing assembly 240 can be movable relative to the plug 132.

The piercing assembly 240 can include many suitable configurations to facilitate piercing the plug 132 for beverage medium access. As one example, the piercing assembly 240 can include a piercing element 242 arranged to pierce the plug 132 to release the beverage medium 120 from the internal space 140 of the container 130. As shown in FIG. 4, the piercing element 242, which can be referred to as a needle, can include a lumen 244 defined therethrough. As described below, movement of the piercing assembly 240 towards and partially into the plug 132 can cause the piercing element 242 to pierce the plug 132 to release the beverage medium 120 from the internal space 140 of the container 130 through the lumen 244 of the piercing element 242. More particularly, once the piercing element 242 pierces the plug 132, a passageway can be defined allowing the beverage medium 120 to flow from the internal space 140 of the container 130, through the plug 132, and through the cap 134 via the lumen 244 defined in the piercing element 242.

The lumen 244 can be arranged to improve flow and/or evacuation of the beverage medium 120 from the container 130. As best shown in FIGS. 4, 5, and 7, the lumen 244 can be non-concentrically aligned with the piercing element 242, such as being offset from the center of the piercing element 242. More particularly, a centerline of the lumen 244 can be spaced or offset from a centerline of the piercing element 242. Additionally or alternatively, the piercing element 242 can include a side port 254 in fluid communication with the lumen 244.

The side port 254 can be defined in many ways to facilitate pressurized gas entry into the container 130. In one example, a terminal end 260 of the piercing element 242 can be defined by a partial annular wall 262 such that the partial annular wall 262 only partially surrounds the lumen 244. In other examples, the side port 254 can be an aperture defined in a sidewall of the piercing element 242. In these and other examples, the side port 254 can be spaced away from the terminal end 260 of the piercing element 242 such that the side port 254 is defined closely adjacent to the top wall 162 of the plug 132 when the piercing element 242 pierces the plug 132 (see FIG. 7). In this manner, greater amounts of the beverage medium 120 can be evacuated from the beverage pod 122 compared to previous designs where a small amount of medium remains in the pod due to an outlet being positioned above a corresponding sealing member. As shown in FIGS. 4, 5, and 7, the side port 254 can also be spaced away from a bottom 270 of the piercing element 242. In such examples, the piercing element 242 can annularly seal against the plug 132 when the piercing element 242 fully pierces the plug 132 (see FIG. 7).

Referring to FIGS. 4-7, the piercing assembly 240 can be defined as a rolling diaphragm structure. In some examples, the piercing assembly 240 includes a cylindrical piston 282 with a bottom wall 284. The piercing element 242 can extend from the piston 282, such as upwardly from the bottom wall 284 of the piston 282. The piercing assembly 240 can include a resilient annular web 290 connecting the piston 282 to the bottom flange 202 of the cap 134. In such examples, the web 290 can bend, flex, or otherwise move to allow the piston 282 to move towards the plug 132. The web 290 can be defined by a resiliently flexible web of material to allow resilient deformation of the piercing assembly 240.

As shown, the piercing assembly 240 can be dimensioned to define an annular space 296 between the bottom flange 202 of the cap 134 and the piston 282 of the piercing assembly 240. The annular space 296 can be dimensioned to allow sufficient deformation of the piercing assembly 240 without failure. For instance, a larger annular space 296 can allow greater movement of the piercing assembly 240 relative to the outer portion 200 of the cap 134, or vice-versa. The characteristics of the web 290 can provide a desired actuation force to move the piston 282 towards the plug 132. For instance, the web 290 can be sized, shaped, and/or formed from certain materials such that the piercing element 242 moves sufficiently towards and pierces the plug 132 in response to an actuation force of around 40 lbs, such as between 35 lbs and 45 lbs. In some examples, the actuation force can be as low as 30 lbs or 25 lbs. In other embodiments, other actuation forces can be used, and can be adapted based on a surface area of the piston 282, the materials used to form the web 290, and/or other considerations as appropriate for a given application.

The piercing assembly 240 can include other features for convenience. For example, the piercing assembly 240 can include strengthening features to limit deformation of the piercing element 242. For instance, one or more strengthening ribs 304 can extend from and between the piercing element 242 and the bottom wall 284 of the piston 282 to limit lateral movement of the piercing element 242 relative to the piston 282.

In some examples, the piercing element 242 can include a drip ledge 310 arranged to define the flow of the beverage medium 120 as the beverage medium 120 passes through the cap 134. The drip ledge 310, which can be referred to as a nozzle, can extend from the bottom wall 284 of the piston 282. The drip ledge 310 can define an aperture 312 in fluid communication with the lumen 244. For instance, the drip ledge 310 can annularly surround the lumen 244. The drip ledge 310 and the piercing element 242 can extend from opposing sides of the bottom wall 284. The drip ledge 310 can limit wicking of the beverage medium 120 along the bottom wall 284 of the piston 282 and away from the lumen 244.

Referring to FIGS. 2, 4, 5, and 7, the cap 134 can include a gas inlet port 324 arranged to deliver pressurized gas into the internal space 140 of the container 130 to help force the flow of the beverage medium 120 from the beverage pod 122. The gas inlet port 324 can be defined adjacent to the bottom flange 202, such as within a recessed scalloped region 330 of the second element 206 of the outer portion 200. When the beverage pod 122 is positioned within the beverage machine 100, the gas inlet port 324 can mate with a gas source of the beverage machine 100 to provide pressurized gas to the beverage pod 122. The gas can be supplied by an air pump that operates to provide pressurized air for dispensing the beverage from the pod 122. The gas can be supplied to the gas inlet port 324 at about 5 psi, such as between 2 psi and 10 psi. In other embodiments, other components and systems can be used for supplying the pressurized air, including using a pressurized canister or bottle, which can be the same pressurized canister or bottle supplying gas to carbonate the precursor liquid.

The gas inlet port 324 can be in fluid communication with the lumen 244 of the piercing element 242. For example, as shown in FIG. 4, the gas inlet port 324 can be in fluid communication with a cavity 340 defined between the plug 132 and the piercing assembly 240. In such examples, when the piercing element 242 pierces the plug 132, the pressured gas can be delivered into the internal space 140 of the container 130 through the lumen 244 of the piercing element 242.

Depending on the configuration of the piercing element 242, the pressurized gas can be delivered into the internal space 140 of the container 130 through the side port 254 of the piercing element 242. As the gas enters the container 130, the gas can pressurize the space within the container 130 above the beverage medium 120. The pressurized space above the beverage medium 120 can force the beverage medium 120 through the lumen 244 of the piercing element 242 and out of the cap 134. In this manner, the beverage pod 122 can include a single orifice to pressurize the beverage pod 122 and allow the beverage medium 120 to exit the container 130. Once the beverage medium 120 exits the cap 134, the beverage medium 120 can be mixed with a carbonated liquid to generate a beverage.

FIG. 8 is an enlarged schematic view of the connection between the various elements of the beverage pod 122 prior to engagement of the elements. FIG. 9 is an enlarged schematic view of the connection between the various elements of the beverage pod 122 once the elements are engaged. Referring to FIGS. 4 and 7-9, the beverage pod 122 can include a gasket 350. The gasket 350 can engage the container 130, the plug 132, and the cap 134 to seal the beverage pod 122. The gasket 350 can create a plurality of seals within the beverage pod 122. For instance, the beverage pod 122 can create a first seal 352 between the plug 132 and the container 130 to limit leakage between the container 130 and the plug 132. The beverage pod 122 can also create a second seal 354 between the container 130 and the cap 134 to limit leakage between the container 130 and the cap 134. In this manner, the gasket 350 can limit leakage of the beverage medium 120 from the container 130 as well as allow pressurization of the container 130, as explained below.

Referring to FIGS. 8 and 9, the gasket 350 can be positioned at least partially between the container 130 and the plug 132, such as between the container flange 144 of the container 130 and the plug flange 166 of the plug 132. In such examples, the gasket 350 can engage the top surface 170 of the plug flange 166. When the cap 134 is coupled to the container 130, the coupling of the cap 134 to the container 130 can cause the gasket 350 to deform laterally sufficient that it also engages the cap 134. For instance, the coupling of the cap 134 to the container 130 can compress the gasket 350 between the plug 132 and the container flange 144.

As shown in FIG. 9, compression of the gasket 350 can cause the gasket 350 to expand radially outward to engage the cap 134. In this configuration, the gasket 350 limits leakage of the beverage medium 120 from the container 130 by sealing the interface between the container 130 and the plug 132. This configuration also limits leakage of fluid between the cap 134 and container 130 to allow sufficient pressurization of the container 130. Without the gasket 350 contacting the cap 134, the pressurized gas supplied to the gas inlet port 324 can leak past the engagement between the cap 134 and the container 130. Though a single gasket 350 is sufficient to seal the beverage pod 122, in some examples the beverage pod 122 can include additional seals, such as a seal positioned between the cap 134 and the plug flange 166 of the plug 132.

Operation of the beverage pod 122 will now be discussed in more detail. To make a desired beverage, a user can select a corresponding beverage pod 122 and insert the beverage pod 122 within the beverage machine 100. The beverage making process can be initiated by the beverage machine 100, such as automatically upon receipt of the beverage pod 122 or upon user actuation of a control assembly. Once the beverage making process is initiated, the beverage machine 100 can cause the piercing element 242 to pierce the plug 132. For instance, the beverage machine 100 can include an anvil or similar structure configured to contact the bottom wall 284 of the piston 282. In such examples, the anvil can move the piston 282 towards the plug 132 to cause the piercing element 242 to pierce the plug 132. At or about the same time, the beverage machine 100 can pump pressurized gas into the cavity 340 through the gas inlet port 324. As the piercing element 242 pierces the plug 132, the pressurized gas can pass through the side port 254 and lumen 244 of the piercing element 242 and into the container 130. The pressurized gas can continue to pass into the container 130 via the lumen 244 until the bottom 270 of the piercing element 242 seals against the plug 132.

When the bottom 270 of the piercing element 242 seals against the plug 132, the beverage medium 120 can be emptied from the beverage pod 122 through the lumen 244 of the piercing element 242. For instance, the beverage medium 120 can pass through the lumen 244 and out of the aperture 312 defined by the drip ledge 310. Once the beverage medium 120 is emptied from the beverage pod 122, the beverage medium 120 can be combined with the precursor liquid to form the desired beverage dispensed at the dispensing station 108.

The beverage pod 122 can be formed from a variety of materials and means. For example, portions of the beverage pod 122 (e.g., the cap 134 and the plug 132) can be formed from a thermoplastic material (self-reinforced or fiber reinforced), HDPE, ABS, polycarbonate, polypropylene, polystyrene, PVC, polyamide, LDPE (low-density polyethylene), and/or PTFE, among others. In some examples, portions of the beverage pod 122 can be formed from aluminum or other similar metal. In some examples, portions of the beverage pod 122 (e.g., the container 130) can be formed from glass or similar material. The gasket 350 can be formed from a rubberized material or other suitable material. The materials can be food grade. In some examples, the beverage pod 122 can be made of, or otherwise include, materials that provide a barrier to moisture and/or gases, such as oxygen, water vapor, etc. The beverage pod 122 can be formed or molded in any suitable manner, such as by plug molding, blow molding, injection molding, casting, or the like.

In accordance with one aspect of the present disclosure, the beverage pod 122 can include an indicator that is readable by an indicator reader of the beverage machine 100. As non-limiting, illustrative examples, the indicator can be an RFID tag, barcode, alphanumeric string, taggant, taggant ink, or other suitable indicator. The indicator can be used to provide any suitable information to the beverage machine 100 or to the user. For example, the indicator can inform the beverage machine 100 of the type of contents contained within the beverage pod 122 such as a specific flavor, volume, gas-only, or beverage material-only, which can cause the beverage machine 100 to perform operation that is suitable for such contents. In some embodiments, the indicator can provide product authentication, expiration information, and/or manufacturing information such as lot number and manufacturing facility.

It should be noted that any of the features in the various examples and embodiments provided herein can be interchangeable and/or replaceable with any other example or embodiment. As such, the discussion of any component or element with respect to a particular example or embodiment is meant as illustrative only. In addition, it should be noted that the methods described above describe possible implementations, and that the operations and the steps can be rearranged or otherwise modified and that other implementations are possible. Furthermore, aspects from two or more of the methods can be combined.

All relative and directional references (including: upper, lower, upward, downward, left, right, leftward, rightward, top, bottom, side, above, below, front, middle, back, vertical, horizontal, and so forth) are given by way of example to aid the reader's understanding of the particular examples described herein. They should not be read to be requirements or limitations, particularly as to the position, orientation, or use unless specifically set forth in the claims. Connection references (e.g., attached, coupled, connected, secured, joined, and the like) are to be construed broadly and can include intermediate elements between a connection of elements and relative movement between elements. As such, connection references do not necessarily infer that two elements are directly connected and in fixed relation to each other, unless specifically set forth in the claims.

The description herein is provided to enable a person skilled in the art to make or use the disclosure. Various modifications to the disclosure will be readily apparent to those skilled in the art, and the generic principles defined herein can be applied to other variations without departing from the scope of the disclosure. Thus, the disclosure is not limited to the examples described herein, but is to be accorded the broadest scope consistent with the principles and novel features disclosed herein.

What is claimed is:

1. A beverage pod for a beverage machine, the beverage pod comprising:
   a container having an internal space and an opening extending into the internal space;
   a beverage medium located within the internal space;
   a plug configured to seal the container at the opening; and
   a cap secured to the container around the opening and operable to selectively engage a portion of the plug to release the beverage medium, the cap comprising a bottom flange and a piercing assembly configured to deform to move relative to the plug and engage the plug, wherein the piercing assembly comprises a rolling diaphragm structure including a cylindrical piston with a bottom wall, a piercing element extending from the cylindrical piston, and a resilient annular web connecting the cylindrical piston to the bottom flange of the cap.

2. The beverage pod of claim 1, wherein:
   the piercing element defining a lumen; and
   movement of the piercing assembly towards and partially into the plug causes the piercing element to pierce the plug for release of the beverage medium from the internal space through the lumen, wherein a centerline of the lumen is offset from a centerline of the piercing element.

3. The beverage pod of claim 2, wherein the piercing element further includes a side port configured to define a flow path into the internal space in response to the movement of the piercing element towards the plug.

4. The beverage pod of claim 3, wherein the cap further comprises a gas inlet port fluidically coupled with the side port and arranged to deliver pressurized gas into the internal space of the container.

5. The beverage pod of claim 2, further comprising a drip ledge extending from a bottom surface of the piercing assembly and configured to direct beverage medium from the lumen and toward the beverage machine.

6. The beverage pod of claim 1, further comprising a gasket positioned at least partially between the container and the plug.

7. The beverage pod of claim 6, wherein:
   the plug includes an annular plug flange; and
   the gasket is positioned between the plug flange of the plug and a container flange of the container.

8. The beverage pod of claim 7, wherein the gasket engages the container, the plug, and the cap.

9. A cap for a beverage pod, the cap comprising:
   an outer portion engageable with a container;
   a piercing assembly comprising a rolling diaphragm structure configured to deform to move relative to the outer portion and engage the outer portion, wherein the outer portion surrounds the piercing assembly, the piercing assembly including:
     a cylindrical piston with a bottom wall;
     a resilient annular web connecting the cylindrical piston to the outer portion; and
     a piercing element extending from the cylindrical piston and defining a lumen; and
   a gas inlet port in fluid communication with the piercing element.

10. The cap of claim 9, wherein a centerline of the lumen is offset from a centerline of the piercing element.

11. The cap of claim 9, wherein the piercing element includes a side port in fluid communication with the gas inlet port.

12. The cap of claim 9, further comprising a drip ledge extending from a bottom wall of the piston, the drip ledge defining an aperture in fluid communication with the lumen and being configured to direct beverage medium from the lumen and toward a beverage machine.

13. A beverage pod for a beverage machine, the beverage pod comprising:
    a container having an internal space and an opening to the internal space;
    a beverage medium located within the internal space of the container;
    a plug positioned to cover the opening of the container, the plug positioned at least partially within the opening of the container;
    a cap secured to the container, the cap including a deformable piercing assembly configured to deform to move relative to the plug and engage the plug wherein the piercing assembly comprises a rolling diaphragm structure connecting the piston to a bottom flange of the container, the deformable piercing assembly including a cylindrical piston with a bottom wall, a piercing element extending from the cylindrical piston, and a resilient annular web connecting the cylindrical piston to the bottom flange of the container; and
    a gasket arranged to create a first seal between the plug and the container, and a second seal between the container and the cap.

14. The beverage pod of claim 13, wherein the gasket engages each of the container, the plug, and the cap.

15. The beverage pod of claim 13, wherein:
    the gasket is positioned between the plug and the container; and
    the cap engages at least a portion of the plug.

16. The beverage pod of claim 15, wherein the cap is integrated with the beverage pod to compress the gasket between the plug and the container.

17. The beverage pod of claim 13, wherein the gasket is configured to maintain the internal space at a pressure above an ambient pressure surrounding the beverage pod.

* * * * *